United States Patent
Yoneda et al.

(10) Patent No.: US 7,640,815 B2
(45) Date of Patent: Jan. 5, 2010

(54) MAGNETOSTRICTION TYPE TORQUE SENSOR

(75) Inventors: Atsuhiko Yoneda, Saitama (JP); Yasuo Shimizu, Saitama (JP); Shunichiro Sueyoshi, Saitama (JP); Yoshihiro Oniwa, Saitama (JP); Yutaka Arimura, Saitama (JP); Takashi Miyoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/723,071

(22) Filed: Mar. 16, 2007

(65) Prior Publication Data

US 2007/0283768 A1    Dec. 13, 2007

(30) Foreign Application Priority Data

Apr. 17, 2006  (JP) .............................. 2006-113252

(51) Int. Cl.
  *G01L 3/00* (2006.01)
(52) U.S. Cl. ................................. 73/862.333
(58) Field of Classification Search .................. 73/862.331–862.338
  See application file for complete search history.

(56) References Cited

U.S. PATENT DOCUMENTS

| | | | | |
|---|---|---|---|---|
| 4,300,085 | A * | 11/1981 | Monma et al. ............ | 318/696 |
| 4,972,728 | A * | 11/1990 | Yoshimura et al. ........ | 73/862.333 |
| 4,989,460 | A * | 2/1991 | Mizuno et al. ........... | 73/862.335 |
| 5,902,934 | A * | 5/1999 | Sprague et al. .......... | 73/779 |
| 6,422,095 | B1 * | 7/2002 | Shimizu et al. .......... | 73/862.335 |
| 6,698,299 | B2 * | 3/2004 | Cripe .................. | 73/862.331 |
| 6,966,232 | B2 * | 11/2005 | Asaumi et al. .......... | 73/862.333 |

FOREIGN PATENT DOCUMENTS

| | | |
|---|---|---|
| JP | 2004-239652 A | 8/2004 |
| JP | 2005-321316 A | 11/2005 |
| JP | 2005-331453 A | 12/2005 |

* cited by examiner

*Primary Examiner*—Lisa M Caputo
*Assistant Examiner*—Octavia Davis
(74) *Attorney, Agent, or Firm*—Arent Fox LLP.

(57) ABSTRACT

A magnetostriction type torque sensor is provided which includes magnetic property change material which is provided on a shaft and whose magnetic property changes in accordance with torque applied to the shaft, an excitation signal generator which generates an excitation signal whose voltage is converted into a predetermined voltage through a switching element, a plurality of detection coils to which the excitation signal generator applies the excitation signal, and which plurality of detection coils outputs voltage, which changes in accordance with change in the magnetic property of the magnetic property change material, between connection points between the detection coils, and an operational state monitor which monitors an operational state of the switching element.

5 Claims, 7 Drawing Sheets

EXCITATION SIGNAL I

FIG. 2B

MONITORING SIGNAL A

FIG. 2C

VOLTAGE OF DETECTION COIL

FIG. 2D

CURRENT OF DETECTION COIL

MAGNETOSTRICTION TYPE TORQUE SENSOR

CROSS REFERENCE TO RELATED APPLICATIONS

This application claims the foreign priority benefit under Title 35, United States Code, §119(a)-(d) of Japanese Patent Application No. 2006-113252, filed on Apr. 17, 2006 in the Japan Patent Office, the disclosure of which is herein incorporated by reference in its entirety.

BACKGROUND OF THE INVENTION

1. Field of the Invention

The present invention relates to a magnetostriction type torque sensor which detects magnetic property change of magnetic property change material which is attached around a shaft.

2. Description of the Related Art

In an electric power steering device installed in a vehicle, a torque sensor detects torque which is given to a steering shaft by driver's steering. Thus, steering assist power is provided depending on torque signals output from the torque sensor. A magnetostriction type torque sensor is disclosed as such a torque sensor (See JP2004-239652A and JP2005-331453A). In this technology, a magnetostriction film having magnetic anisotropy is attached on a surface of the shaft. Then, the torque is applied to the shaft from the outside so that magnetic permeability change in the magnetostriction film corresponding to twisting force is detected as change in an impedance property of a detection coil. Moreover, in technologies disclosed in JP2005-331453A and JP2005-321316A, a pulse of excitation voltage is applied so that the change in the impedance property of the detection coil is detected. In the technologies, the pulse of the excitation voltage is applied so that a maximum of increasing current which flows in the detection coil is limited within a predetermined range.

SUMMARY OF THE INVENTION

However, an ON-failure in which a switching element is short-circuited is not considered in the torque sensors described in JP2004-239652A, JP2005-331453A, or JP2005-321316A. Here, in a case where the excitation voltage is applied to a series circuit which includes two detection coils and a switching element, a potential state at a connection point between the two detection coils while the torque is not given are in particular discussed. In a normal state, an intermediate potential of a potential generated by the excitation voltage appears at the connection point of the detection coils. On the other hand, in the ON-failure state, direct current determined by internal resistance and applied DC voltage of the detection coil flows in the detection coil, and the intermediate potential appears at the connection point of the detection coils. In other words, the intermediate potential of the potential generated by the applied voltage appears at the connection point of the detection coils even in the normal state, as well as, in the ON-failure state. Therefore, it is difficult to distinguish the normal state from the ON-failure state. Moreover, it is preferable that the normal state is distinguished from an OFF-failure state.

In view of the above, an object of the present invention is to provide a magnetostriction type torque sensor which distinguishes a normal state from a failure state of a switching element.

To solve the above-described problems, in one aspect of the present invention, there is provided a magnetostriction type torque sensor including magnetic property change material which is provided on a shaft and whose magnetic property changes in accordance with torque applied to the shaft, an excitation signal generator which generates an excitation signal whose voltage is converted into a predetermined voltage through a switching element, a plurality of detection coils to which the excitation signal generator applies the excitation signal, and which plurality of detection coils outputs voltage, which changes in accordance with change in the magnetic property of the magnetic property change material, between connection points between the detection coils, and an operational state monitor which monitors an operational state of the switching element.

In the magnetostriction type torque sensor, the magnetic property of the magnetic property change material changes in accordance with the torque applied to the shaft. Moreover, the excitation signal generator applies the excitation signal to the plurality of the detection coils. Accordingly, the change of the magnetic property is detected based on the voltage between the connection points between the detection coils. At this time, the operational state monitor monitors the operational states of the switching elements so as to prevent excessive current and disconnection due to an ON-failure in the switching element.

In the magnetostriction type torque sensor, the magnetic property change material may include a first magnetostriction film and a second magnetostriction film which are attached in an axial direction on two parts of the shaft which are close to each other. In addition, the first magnetostriction film and the second magnetostriction film may be anisotropic in opposite directions to each other. Moreover, the plurality of the detection coils may be placed separated from the shaft on which the first magnetostriction film and the second magnetostriction film are attached.

In the magnetostriction type torque sensor, the first magnetostriction film and the second magnetostriction film which are respectively attached in the axial direction on the two parts of the shaft which are close to each other are anisotropic in the opposite directions to each other. Therefore, an intermediate potential before the torque is applied and a detected potential while the torque is being applied are compared so as to detect a direction of the torque and compensate thermal characteristics. The difference between the intermediate potential and the detected potential can be obtained from the change in voltage between the connection points between the detection coils. Moreover, the operational states of the switching elements are monitored. When the operational state is monitored, a voltage between both ends of each of the switching elements is monitored.

In the magnetostriction type torque sensor, the operational state monitor may monitor a monitoring signal taken between the detection coil and the switching element. Moreover, the operational state monitor may include a failure determiner which determines whether there is a failure in the switching element based on the monitoring signal.

In the magnetostriction type torque sensor, the failure determiner may determine that there is a failure in the switching element when the monitoring signal is kept at an earth potential or a power supply potential.

BRIEF DESCRIPTION OF THE DRAWINGS

The object and features of the present invention will become more readily apparent from the following detailed description taken in conjunction with the accompanying drawings in which.

DESCRIPTION OF THE PREFERRED EMBODIMENTS

Here will be described embodiments of the present invention in detail, referring to the accompanying drawings as needed.

First Embodiment

A magnetostriction type torque sensor unit according to an embodiment of the present invention will be described, below.

Figure 1:
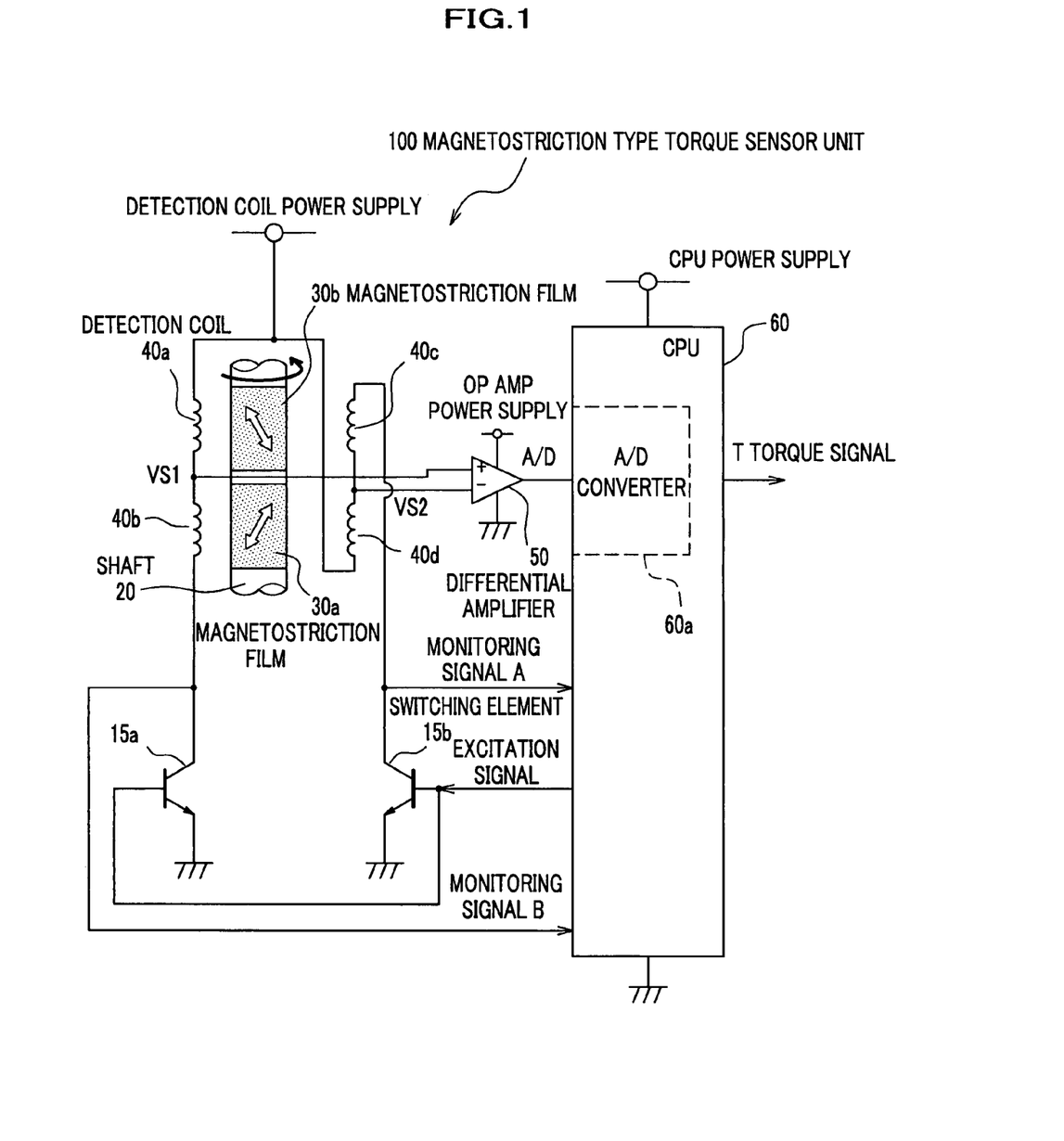
FIG. 1 is a configuration diagram of a magnetostriction type torque sensor unit according to an embodiment of the present invention.

A magnetostriction type torque sensor unit 100 shown in FIG. 1 is used to detect torque applied to a steering shaft in an electric power steering device which will be described later. The magnetostriction type torque sensor unit 100 includes magnetostriction films (magnetic property change material, or a first magnetostriction film and a second magnetostriction film) 30a and 30b which are attached in the axial direction on the two parts of the shaft (steering shaft) 20 which are close to each other, detection coils 40a and 40b which are connected in a series and detection coils 40c and 40d which are connected in a series in an opposite direction to the detection coils 40a and 40b, a differential amplifier 50 which calculates a differential voltage between a connection point VS1 between the detection coils 40a and 40b, and a connection point VS2 between the detection coils 40c and 40d, a switching element 15a which applies excitation voltage to the detection coils 40a and 40b, a switching element 15b which applies excitation voltage to the detection coils 40c and 40d, and a CPU 60 which processes voltages output from the differential amplifier 50 as signals and outputs a torque signal T. In addition, the CPU 60 generates excitation signals which control the switching elements 15a and 15b. Meanwhile, monitoring signals A and B which respectively monitor the switching elements 15a and 15b are input to the CPU 60. The CPU 60 determines states of the monitoring signals A and B and functions as an operational state monitor which monitors operational states of the switching elements 15a and 15b. In addition, the CPU 60 also functions as a failure determiner which determines whether there is a failure in the switching elements 15a and 15b. Moreover, the detection coil 40a, 40b, 40c, and 40d function as detectors which detect the magnetic property change in the magnetostriction films 30a and 30b.

The magnetostriction films 30a and 30b are films of the magnetic property change material which are magnetically anisotropic such as Fe—Ni system and the Fe—Cr system, for instance. Moreover, the magnetostriction films 30a and 30b are respectively attached in an axial direction on two parts of the shaft 20 which are close to each other so as to be anisotropic in opposite directions. Therefore, difference between magnetic permeabilities (change in a magnetic property) of the magnetostriction films 30a and 30b appears when the torque is applied to the shaft 20 in one direction, and difference between the magnetic permeabilities appears in the opposite direction when the torque is applied in the opposite direction.

Here, how to attach the magnetostriction films 30a and 30b and how to make the magnetostriction films 30a and 30b anisotropic are described. First of all, the shaft 20 is heat-treated so that Rockwell hardness becomes HRC40-65. Then, the magnetostriction films 30a and 30b, which are plated or deposited in an axial direction on vertically separated two parts of an outer peripheral surface of the shaft 20. Next, twisting the shaft 20 provides an anti-clockwise torque T (approximately 10 kgf·m (98 N·m), for instance) to the magnetostriction film 30a. In this state, a coil is used to vibrate the magnetostriction film 30a at a high frequency. Then, the magnetostriction film 30a is heated at approximately 300° C. for a several seconds and then cooled. After that, the torque T in the anti-clock direction is removed from the magnetostriction film 30a. Consequently, the magnetostriction film 30a becomes anisotropic. Next, the shaft 20 is twisted in the opposite direction so as to apply a clockwise torque T (approximately 10 kgf·m (98 N·m), for instance) to the magnetostriction film 30b. In this state, a coil is used to vibrate the magnetostriction film 30b at a high frequency similarly to the magnetostriction film 30a. Thus, the magnetostriction film 30b is heated at approximately 300° C. As a result, the magnetostriction film 30b becomes anisotropic in the opposite direction to the magnetostriction film 30a.

One of the detection coil 40a and one of the detection coil 40b are connected to a non-inverting input (+) of the differential amplifier 50, while one of the detection coil 40c and one of the detection coil 40d are connected to an inverting input (−) of the differential amplifier 50. In other words, a voltage signal between the connection point VS1 in a series circuit which includes the detection coils 40a and 40b and the connection point VS2 in a series circuit which includes the detection coils 40c and 40d is input to the differential amplifier 50. Moreover, the other end of the detection coil 40a and the other end of the detection coil 40d are connected to a detection coil power supply.

The switching elements 15a and 15b are transistors to apply the excitation voltages to the detection coils 40a, 40b, 40c, and 40d and function as an excitation signal generator. A voltage signal at a connection point where the collector of the switching element 15a is connected to the other end of the detection coil 40b is input to the CPU 60 as a monitoring signal B. Meanwhile, a voltage signal at a connection point where the collector of switching element 15b is connected to the other end of the detection coil 40c is input to the CPU 60 as a monitoring signal A. The emitters of the switching elements 15a and 15b are grounded and connected to free-wheeling diodes which are not shown in the figure.

The series circuit which includes the detection coils 40a and 40b or the series circuit which includes the detection coils 40c and 40d detects the difference between the magnetic permeabilities of the magnetostriction films 30a and 30b as an inductance difference. When the excitation voltage is applied to the both ends of the series circuits, change in the difference between the magnetic permeabilities of the magnetostriction films 30a and 30b is detected as change in a potential difference between the connection points VS1 and VS2. In other words, change in the torque is detected by the differences between the potentials at the connection points between the detection coils 40a and 40b and the detection coils 40c and 40d, and an intermediate potential which is a potential before the torque changes. The differences between the potentials at the connection points VS1 and VS2 between the detection coils 40a and 40b and the detection coils 40c and 40d, and the intermediate potential can be obtained from the change in the potential difference (voltage) between the connection points VS1 and VS2. In this case, the detection coils 40c and 40d are connected in the opposite direction to the detection coils 40a and 40b. Therefore, the potential at the connection point VS1 changes in the opposite way to the change in the potential at the connection point VS2. That is to say, comparing to a case of detecting change in an only potential at either connection point, the detection sensitivity is doubled.

The differential amplifier 50 amplifies the potential difference between the connection points VS1 and VS2. The CPU 60 includes an AMD converter 60a so as to convert an analog voltage output from the differential amplifier 50 into a digital signal for signal processes. In addition, the CPU 60 calculates a strength and direction of the torque applied to the shaft 20 to generate the torque signal T. Moreover, the CPU 60 generates the excitation signal which is a rectangular waveform signal. The excitation signal (the current signal) is input to each of the gates of the switching elements 15a and 15b. The differential amplifier 50 is powered by an OP Amp power supply while the CPU 60 is powered by a CPU power supply. Both voltages of the power supplies are 5V.

Figure 2A:
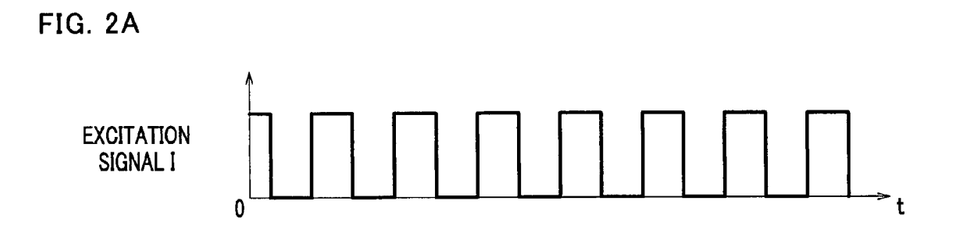
FIG. 2A is a diagram showing a waveform in a part of the magnetostriction type torque sensor unit according to the embodiment of the present invention.
Figure 2B:
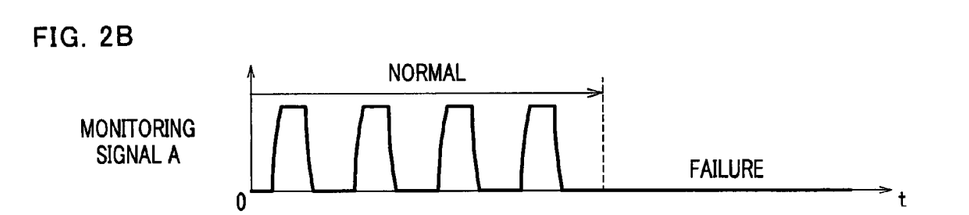
FIG. 2B is a diagram showing a waveform in a part of the magnetostriction type torque sensor unit according to the embodiment of the present invention.

Next, referring to FIGS. 2A-2D, a waveform in each part will be described. FIG. 2A shows a waveform of the excitation signal which is a rectangular waveform signal with a duty ratio of 1/2. The excitation signal controls ON and OFF of the switching elements 15a and 15b (See FIG. 1). In other words, when the excitation signal (the current signal) is at High level, each state of the switching elements 15a and 15b is ON, and each collector potential is equal to the earth potential. Meanwhile, when the excitation signal is at Low level, each state of the switching elements 15a and 15b is OFF, and each collector potential is equal to the power supply potential. By the way, when the state is changed to OFF, magnetic energy which has been accumulated in the detection coils 40a and 40b or the detection coils 40c and 40d is discharged through the free-wheeling diodes. As a result, it is possible to prevent a breakdown of the switching elements 15a and 15b. FIG. 2B shows a waveform of the monitoring signal A which keeps a rectangular waveform identical to the collector voltage waveform itself of the switching element 15b in the normal state. However, a potential of the monitoring signal A is kept equal to the earth potential in the failure state of the switching element 15b. Therefore, whether potentials of the monitoring signals A and B are kept equal to the earth potential determines operational states of the switching elements 15a and 15b.

Figure 2C:
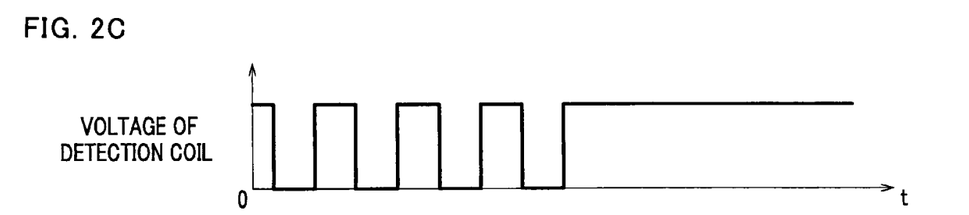
FIG. 2C is a diagram showing a waveform in a part of the magnetostriction type torque sensor unit according to the embodiment of the present invention.

FIG. 2C shows a waveform of voltage in the detection coil. In the normal state, the rectangular waveform voltage whose maximum is not higher than a power supply voltage of the detection coil power supply is applied to the detection coils 40a and 40b and the detection coils 40c and 40d. Meanwhile, in the ON-failure state, that is, the abnormal state, the power supply voltage is continuously applied.

Figure 2D:
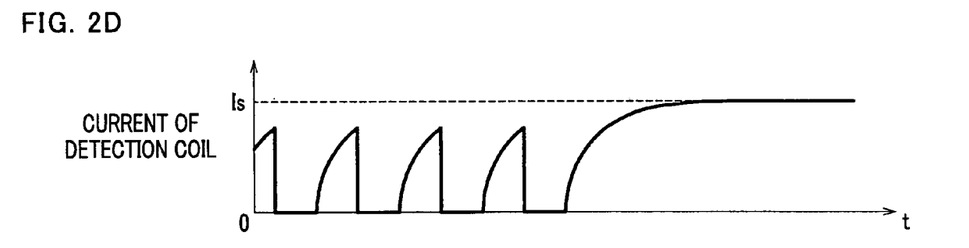
FIG. 2D is a diagram showing a waveform in a part of the magnetostriction type torque sensor unit according to the embodiment of the present invention.

FIG. 2D shows a waveform of current in the detection coil. When the power supply voltage of the detection coil power supply is applied to the detection coils 40a and 40b and the detection coils 40c and 40d, the current monotonically increases with a proportionality factor, which is a reciprocal of an inductance of the detection coil. However, since the permeabilities of the magnetostriction films 30a and 30b are nonlinear, the current is not proportional. The maximum current is limited by a pulse width of the excitation signal. On the other hand, when the states of the switching elements 15a and 15b are changed to OFF, the magnetic energy is discharged through the free-wheeling diodes. Therefore, no current flows in the detection coils 40a and 40b or the detection coils 40c and 40d in the OFF state.

Moreover, in the failure state, the power supply voltage is continuously applied to the detection coils 40a and 40b or the detection coils 40c and 40d so that the current keeps increasing. Consequently, a steady-state current Is flows, which is limited by an internal resistance of the detection coils 40a and 40b or the detection coils 40c and 40d, or excessive current.

As described above, according to the embodiment, the monitoring signals A and B which are voltage signals at ends of the switching elements 15a and 15b are input to the CPU 60. Thus, when the monitoring signals A and B are kept at the earth potential, it is determined that the switching elements 15a and 15b are in ON-failure. As a result, it is possible to prevent the excessive current from flowing in the detection coils 40a, 40b, 40c, and 40d so as to prevent a break.

Second Embodiment

In the first embodiment, the switching elements 15a and 15b are used to apply the positive rectangular waveform voltage to the detection coils 40a and 40b or the detection coils 40c and 40d. On the other hand, a bridge circuit can be used to apply a rectangular waveform AC voltage.

Figure 3:
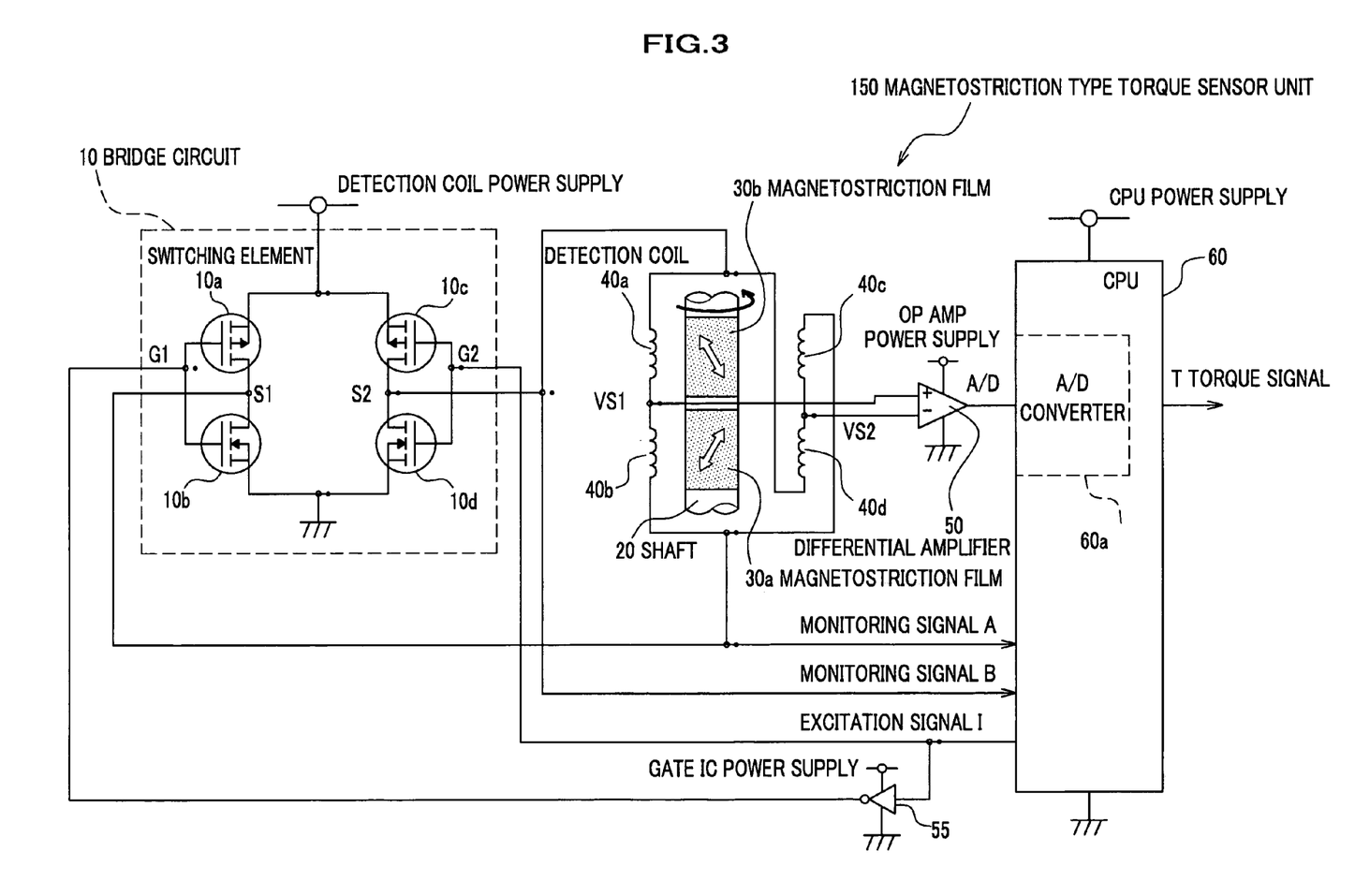
FIG. 3 is a configuration diagram of the magnetostriction type torque sensor unit according to another embodiment of the present invention.

Next, referring to FIG. 3, a magnetostriction type torque sensor unit 150 according to a second embodiment of the present invention will be described. Here, the shaft 20, the magnetostriction films 30a and 30b, the differential amplifier 50, and the CPU 60 are similar to those in the first embodiment. Therefore, only different features from the first embodiment will be described, below.

A bridge circuit 10 includes four switching elements 10a, 10b, 10c, and 10d. The switching elements 10a and 10c are p channel MOSFETs while the switching elements 10b and 10d are n channel MOSFETs. The drains of the switching elements 10a and 10c are connected to a detection coil power supply, while the sources of the switching elements 10b and 10d are grounded. In addition, the source of the switching element 10a and the drain of the switching element 10b are connected to a terminal S1. Meanwhile, the source of the switching element 10c and the drain of the switching element 10d are connected to a terminal S2. Moreover, the gates of the switching element 10a and the switching element 10b are connected to a gate terminal G1. Meanwhile, the gates of the switching element 10c and the switching element 10d are connected to a gate terminal G2. Thus, the switching elements 11a and 10b or the switching elements 11c and 10d form an inverter circuit. In the inverter circuit, when the gate terminals G1 and G2 are at the power supply potential, the terminals S1 and S2 are at the earth potential. On the other hand, when the gate terminals G1 and G2 are at the earth potential, the terminals S1 and S2 are at the power supply potential.

The detection coils 40a, 40b, 40c, and 40d themselves are similar to those in the first embodiment. However, how to connect the detection coils 40a, 40b, 40c, and 40d is different from that in the first embodiment. Specifically, a potential at the connection point where one end of the detection coil 40b and one end of the detection coil 40c are connected to the terminal S1 of the bridge circuit 10 is input to the CPU 60 as a monitoring signal A. Similarly, a potential at the connection point where one end of the detection coil 40a and one end of detection coil 40d are connected to the terminal S2 of the bridge circuit 10 is input to the CPU 60 as a monitoring signal B. Moreover, the connection point VS1 between the other end of the detection coil 40a and the other end of the detection coil 40b is connected to the non-inverting input (+) of the differential amplifier 50. On the other hand, the connection point VS2 between the other end of the detection coil 40c and the other end of the detection coil 40d is connected to the inverting input (−) of the differential amplifier 50. The inverter 55 generates an inverted signal of the excitation signal I. The excitation signal I is input to the gate terminal G2 of the bridge circuit 10 while the inverted signal of the excitation signal I is input to the gate terminal G1.

According to this configuration, in the bridge circuit 10, when the terminal G1 is at the earth potential, the terminal S1 is at the power supply potential. Meanwhile, when the gate terminal G1 is at the power supply potential of the detection coil power supply, the terminal S1 is at the earth potential. Similarly, when the gate terminal G2 is at the earth potential, the terminal S2 is at the power supply potential. Meanwhile, when the gate terminal G2 is at the power supply potential, the terminal S2 is at the earth potential.

Figure 4:
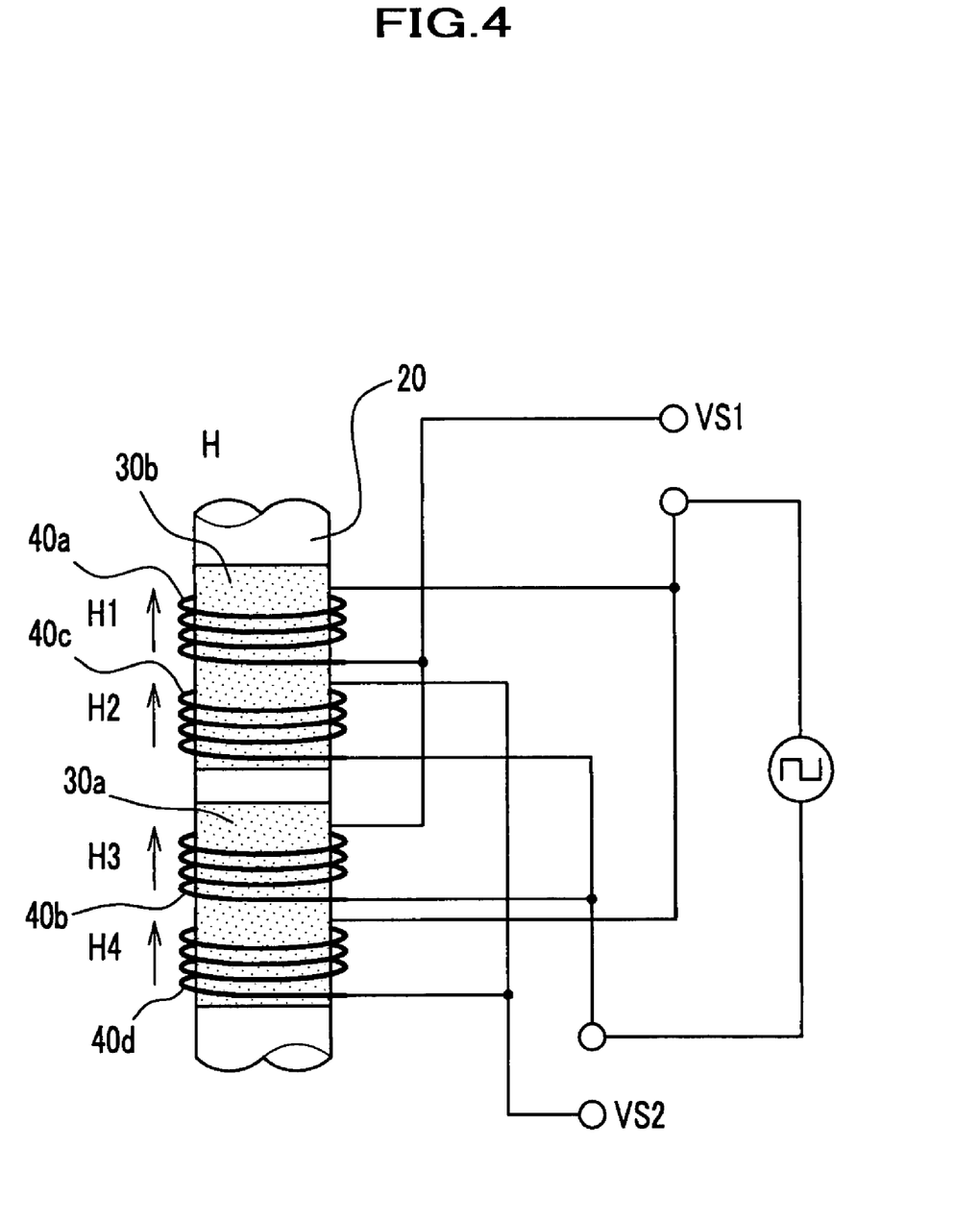
FIG. 4 is a diagram showing that detection coils wind around a shaft and how the detection coils are connected.

FIG. 4 is a diagram showing that the detection coils 40a, 40b, 40c, and 40d wind around the shaft 20. The magnetostriction films 30a and 30b are respectively attached in the axial direction on two parts of the shaft 20 which are close to each other. The detection coils 40a and 40c respectively surround two parts of the surface of the magnetostriction film 30b in the axial direction, separately from the shaft 20. Meanwhile, the detection coils 40b and 40d respectively surround two parts of the surface of the magnetostriction film 30a in the axial direction, separately from the shaft 20. The coils wind in the same direction so as not to cancel magnetic fields H1, H2, H3, and H4. Moreover, the rectangular waveform voltage is applied between the detection coils 40a and 40d and between the detection coils 40b and 40c. The connection point VS1 between the detection coil 40a and the detection coil 40b is extended, while the connection point VS2 between the detection coil 40c and the detection coil 40d is extended.

Figure 5A:
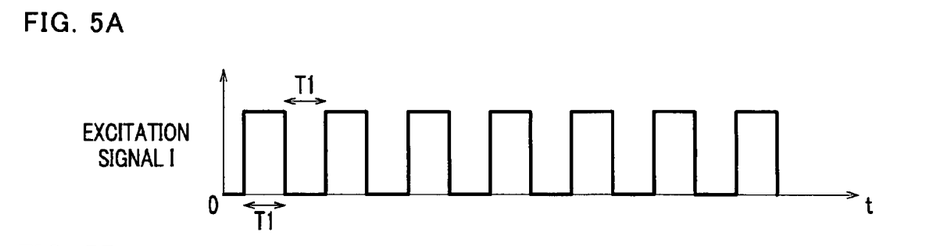
FIG. 5A is a diagram showing a waveform in a part of the magnetostriction type torque sensor unit according to the embodiment of the present invention.
Figure 5B:
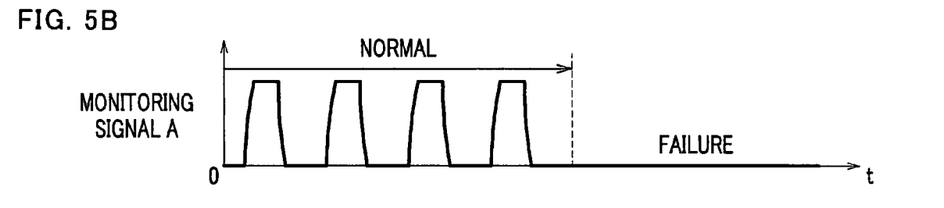
FIG. 5B is a diagram showing a waveform in a part of the magnetostriction type torque sensor unit according to the embodiment of the present invention.
Figure 5C:
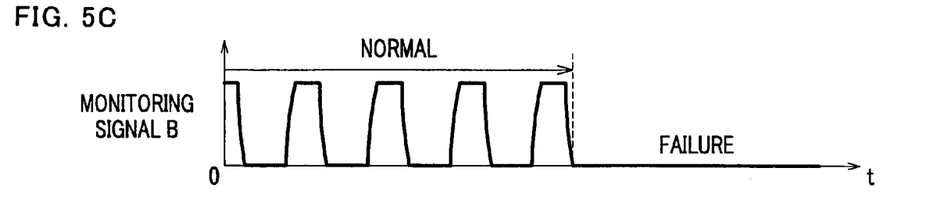
FIG. 5C is a diagram showing a waveform in a part of the magnetostriction type torque sensor unit according to the embodiment of the present invention.

Next, referring to FIGS. 5A-5E, a waveform of each part in the embodiment will be described. FIG. 5A shows a waveform of the excitation signal which is a continuous signal forming a rectangular wave with a pulse width of T1 and a duty ratio of 1/2. FIG. 5B shows a waveform of the monitoring signal A. In the normal state, the monitoring signal A forms a rectangular voltage waveform at the terminal S1 of the bridge circuit 10. On the other hand, in the abnormal state of the On-failure of the switching element 10b, the monitoring signal A is kept at the earth potential. FIG. 5C shows a waveform of the monitoring signal B. In the normal state, the monitoring signal B forms a rectangular voltage waveform at the terminal S2 of the bridge circuit 10. On the other hand, in the abnormal state of the On-failure of the switching element 10d, the monitoring signal B is kept at the earth potential.

Figure 5D:
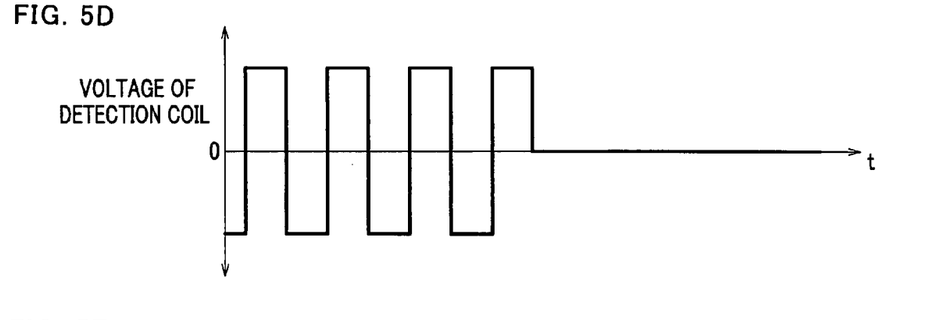
FIG. 5D is a diagram showing a waveform in a part of the magnetostriction type torque sensor unit according to the embodiment of the present invention.

FIG. 5D is a waveform of the voltage in the detection coil.

A high-level signal of the excitation signal I is applied to the gate terminal G2 of the bridge circuit 10, while a low-level signal which is an inverted signal of the high-level signal is applied to the gate terminal G1. Then, the terminal S2 is at the earth potential, and the terminal S1 is at the power supply potential. On the other hand, a low-level signal of the excitation signal I is applied to the gate terminal G2, while a high-level signal which is an inverted signal of the low-level signal is applied to the gate terminal G1. Then, the terminal S1 is at the earth potential, and the terminal S2 is at the power supply potential. As a result, rectangular waveform AC voltage, which alternates between positive and negative voltage, is applied to the series circuit including the detection coils 40a and 40b and the series circuit including the detection coils 40c and 40d. Meanwhile, in the failure state of the ON-failure of the switching elements 10b and 10d or the switching elements 10a and 10c, the voltage is not applied to the detection coils 40a, 40b, 40c, and 40d.

Figure 5E:
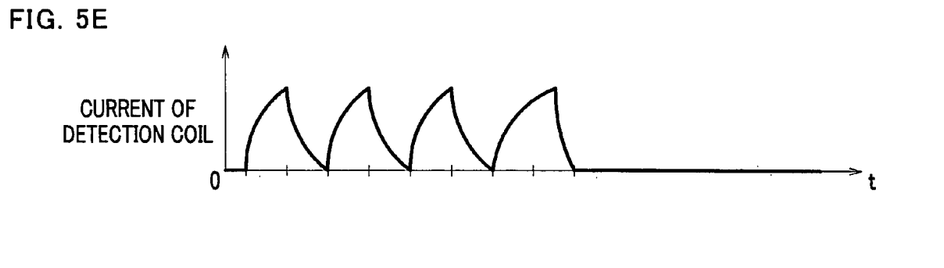
FIG. 5E is a diagram showing a waveform in a part of the magnetostriction type torque sensor unit according to the embodiment of the present invention.

FIG. 5E shows a waveform of current in the detection coils. When positive voltage is applied to the detection coils 40a, 40b, 40c, and 40d, the current which monotonically increases with time with a proportionality factor, which is a reciprocal of an inductance flows. Meanwhile, when negative voltage is applied to the detection coils 40a, 40b, 40c, and 40d, the current which monotonically decreases with time. Here, the increasing current or the decreasing current is limited by a pulse width T1 so that no saturation current is observed. Since magnetic permeability which determines the inductance is nonlinear, the current changes nonlinearly. On the other hand, in the failure state of the ON-failure of the switching elements 10b and 10d or the switching elements 10a and 10c, no current flows. Moreover, in the state where the excitation signal is kept at 5V, the potential of the gate terminal G1 is equal to 0V and the potential of the gate terminal G2 is equal to 5V. Thus, the switching elements 10a and 10d are kept conductive. In this case, the current from the detection coil power supply is continuously supplied to the detection coil.

When the switching element 10a is in the ON-failure, the terminal S1, that is, the monitoring signal A is at the power supply potential though the waveform is not shown in the figure. Therefore, the rectangular waveform voltage between the power supply potential and the earth potential is applied to the detection coils, 40a, 40b, 40c, and 40d. Meanwhile, when the switching element 10c is in the ON-failure, the terminal S2, that is, the monitoring signal B is at the power supply potential. Therefore, the rectangular waveform voltage between the power supply potential and the earth potential is applied to the detection coils 40a, 40b, 40c, and 40d. In other words, according to the embodiment, whether the monitoring signals A and B are kept at the earth potential or the power supply potential determines whether the switching elements 10a, 10b, 10c, and 10d are in the ON-failure.

Example Use

Figure 6:
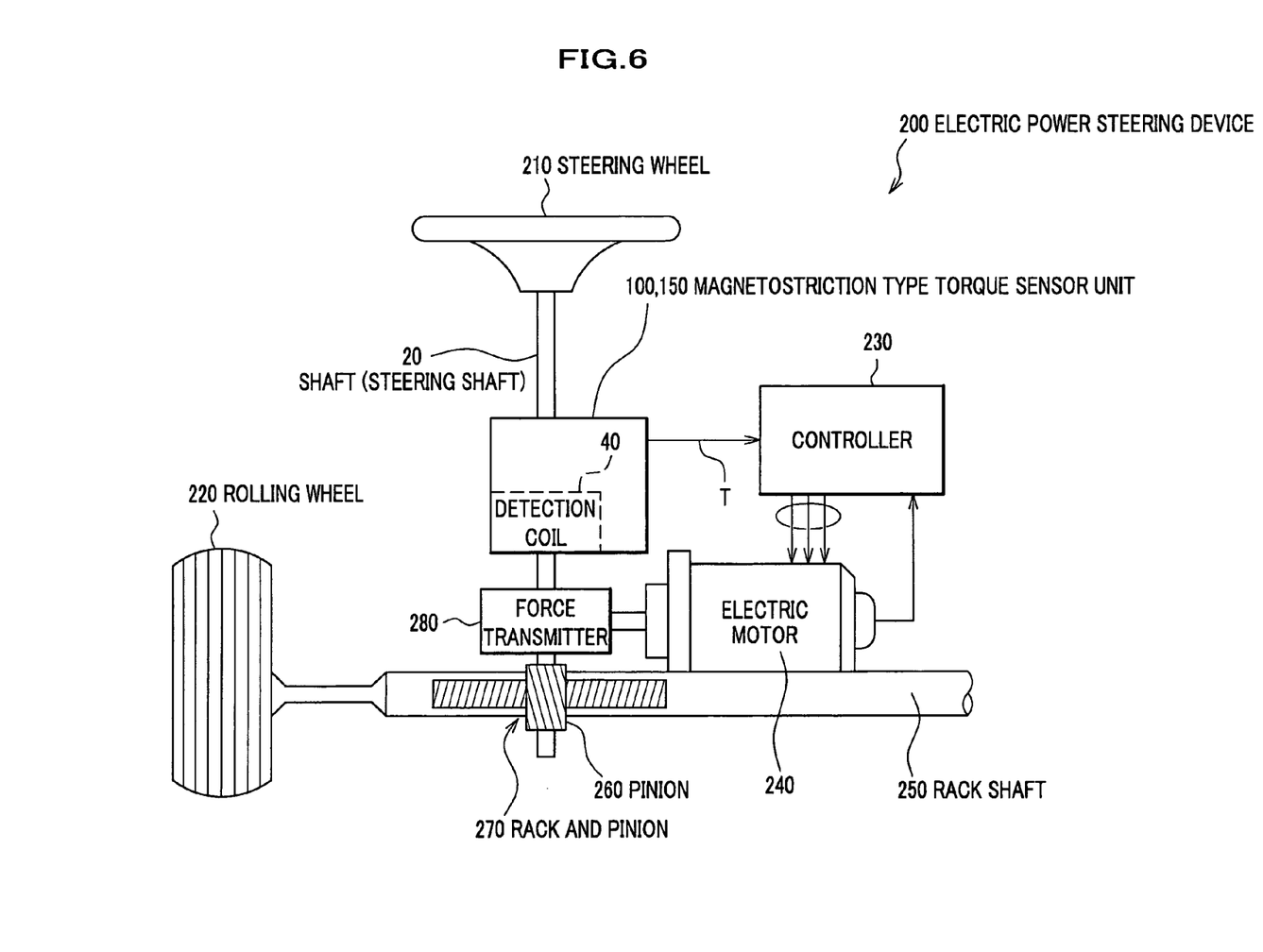
FIG. 6 is a configuration diagram of an electric power steering device.

Next, referring to FIG. 6, description will be given to an electric power steering device which employs the magnetostriction type torque sensor unit 100 or 150 according to the embodiments.

In an electric power steering device 200, a steering wheel 210 is rotated. Then, the shaft 20, which is a steering shaft directly connected to the steering wheel 210, rotates a pinion 260 included in a rack-and-pinion 270. Accordingly, a rack shaft 250 is moved so as to change a direction of the rolling wheel 220. Then, a controller 230 controls to drive an electric motor 240 in accordance with a torque signal T which is detected by the magnetostriction type torque sensor unit 100 or 150 using detection coils 40. The electric motor 240 rotates the pinion 260 through a force transmitter 280 and operates to reduce steering torque of the steering wheel 210. There is the following relationship.

$$TH=TP/(1+KA),$$

where steering torque of a driver is TH, torque transferred to the pinion 260 is TP, and a constant related to a magnitude of supplemental torque which is to be added by the electric motor 240 is KA. Moreover, it is possible to apply the magnetostriction type torque sensor unit 100 or 150 to Steer-By-Wire in which the steering wheel 210 is mechanically separated from the rolling wheel 220.

Comparative Example

Next, a comparative example relating to the present invention will be described.

Figure 7:
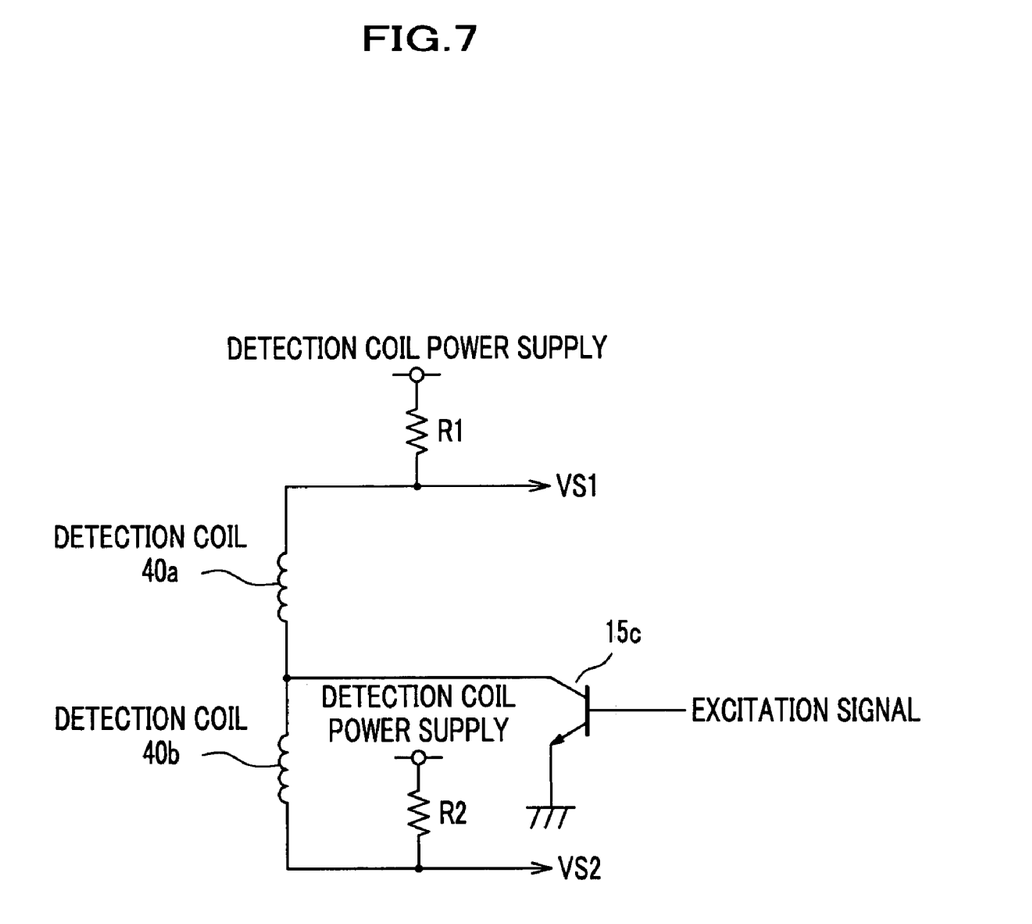
FIG. 7 is a configuration diagram of a torque detection circuit which is an example to be compared with the embodiments.

In a torque detection circuit shown in FIG. 7, a resistor R1, a detection coil 40a, a detection coil 40b, and a resistor R2 are connected in this order in a series. In other words, the detection coils 40a and 40b are connected in a series in the same way with each of the embodiments. However, it is different in that the resistors R1 and R2 are also connected in the series. The switching element 15c is a transistor. The collector is connected to a connection point between the detection coils 40a and 40b. The emitter of the switching element 15c is grounded while an excitation signal (a current signal) is input to the base. Moreover, one end of the resistor R1 and one end of the resistor R2 are connected to the detection coil power supplies. A connection point VS1 between the other end of the resistor R1 and the detection coil 40a is extended while a connection point VS2 between the other end of the resistor R2 and the detection coil 40b is extended.

In the normal state, when the excitation signal at the High level is input to the switching element 15c to turn the switching element 15c ON, exponentially increasing current flows in the detector coils 40a and 40b and the resistors R1 and R2. At this time, the maximum of the increasing current is limited by the pulse width of the excitation signal. It is possible to measure the inductances of the detection coils 40a and 40b by measuring the maximum voltages between the connection points VS1 and VS2. Moreover, when the excitation signal at the Low level is input to the switching element 15c to turn the switching element 15c OFF, the increased current exponentially decreases. Then, as the inductance of the detection coils 40a and 40b change, the potentials at the connection points VS1 and VS2 change.

On the other hand, in the abnormal state of the On-failure of the switching element 15c, the collector potential is kept equal to the earth potential. In the detection coils 40a and 40b and the resistors R1 and R2, the current exponentially increase, and then the maximum current limited by the resistances of the resistors R1 and R2 keep flowing constantly. At this time, the potentials at the connection points VS1 and VS2 are kept equal to the earth potential so that the abnormal state is detected.

Modification Example

The present invention is not limited to the above-described embodiments but may be otherwise variously modified as below.

(1) In the first embodiment, the voltage between the both ends of each of the switching elements 15a and 15b which are connected in the series to the detection coils 40a, 40b, 40c, and 40d is monitored. However, it is also possible to monitor the current which flows in the detection coils 40a, 40b, 40c, and 40d. Thus, the current monitor is included in the operational state monitor.

(2) In each of the embodiments, the detection coils 40c and 40d are connected in the opposite direction to the detection coils 40a and 40b and the differential between the connection points VS1 and VS2 is output. However, when the detection coils 40c and 40d are connected in the same direction with the detection coils 40a and 40b, the potentials change in the same way due to the applied torque so that the output differential is in a vicinity of a zero point. In other words, in the abnormal state, the output differential is out of the vicinity of the zero point. Therefore, the failure detector can detect this.

(3) In the first embodiment, transistors are employed as the switching elements 15a and 15b, but an FET or an IGBT may be employed.

According to the present invention, it is possible to provide a magnetostriction type torque sensor which distinguishes the failure state of the switching element from the normal state.

While the described embodiments represent the preferred forms of the present invention, it is to be distinctly understood that the invention is not limited thereto but may be otherwise variously embodied within the spirit and scope of the following claims.

What is claimed is:

1. A magnetostriction type torque sensor comprising:
   magnetic property change material which is provided on a shaft and whose magnetic property changes in accordance with torque applied to the shaft;
   an excitation signal generator which generates an excitation signal whose voltage is converted into a predetermined voltage through a switching element;
   a plurality of detection coils to which the excitation signal generator applies the excitation signal, and which plurality of detection coils outputs a voltage in accordance with a change in the magnetic property of the magnetic property change material; and
   an operational state monitor which monitors an operational state of the switching element,
   wherein the operational state monitor monitors a monitoring signal taken between the detection coil and the switching element, and
   wherein the operational state monitor comprises a failure determiner which determines whether there is a failure in the switching element based on the monitoring signal.

2. The magnetostriction type torque sensor as claimed in claim 1, wherein the magnetic property change material includes a first magnetostriction film and a second magnetostriction film both of which are attached in an axial direction respectively on two parts of the shaft which are close to each other, wherein the first magnetostriction film and the second magnetostriction film are anisotropic in opposite directions to each other, and wherein the plurality of the detection coils are placed separately from the shaft on which the first magnetostriction film and the second magnetostriction film are attached.

3. The magnetostriction type torque sensor as claimed in claim 2, wherein the operational state monitor monitors a monitoring signal taken between the detection coil and the switching element, and wherein the operational state monitor comprises a failure determiner which determines whether there is a failure in the switching element based on the monitoring signal.

4. The magnetostriction type torque sensor as claimed in claim 3, wherein the failure determiner determines that there is a failure in the switching element when the monitoring signal is kept at an earth potential or a power supply potential.

5. The magnetostriction type torque sensor as claimed in claim 1, wherein the failure determiner determines that there is a failure in the switching element when the monitoring signal is kept at an earth potential or a power supply potential.

* * * * *